(12) United States Patent  
Benson et al.

(10) Patent No.: US 8,070,091 B2
(45) Date of Patent: Dec. 6, 2011

(54) ELECTROMECHANICAL ACTUATION SYSTEM AND METHOD

(75) Inventors: Dwayne M. Benson, Chandler, AZ (US); Casey Hanlon, Queen Creek, AZ (US); Dean Wilkens, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 562 days.

(21) Appl. No.: 12/247,930

(22) Filed: Oct. 8, 2008

(65) Prior Publication Data

US 2010/0084517 A1    Apr. 8, 2010

(51) Int. Cl.
*B64C 27/52* (2006.01)

(52) U.S. Cl. ............ 244/17.25; 244/99.4; 244/99.9; 244/17.13; 244/17.27

(58) Field of Classification Search ........ 244/17.25, 244/99.4, 99.9, 17.13, 17.27; 91/508, 509; 92/403–406; 416/102, 148, 159, 162, 164, 416/168 A, 168 R See application file for complete search history.

(56) References Cited

U.S. PATENT DOCUMENTS

| | | | |
|---|---|---|---|
| 2,630,022 A | 3/1953 | Terdina | |
| 2,665,084 A | 1/1954 | Feeney et al. | |
| 3,145,330 A | 8/1964 | Hecht | |
| 3,198,082 A * | 8/1965 | Kerris | 91/1 |
| 3,411,410 A * | 11/1968 | Westbury et al. | 91/1 |
| 3,504,248 A | 3/1970 | Miller | |
| 3,585,902 A | 6/1971 | Anderson | |
| 3,733,039 A | 5/1973 | O'Connor et al. | |
| 3,762,237 A * | 10/1973 | Stevko | 74/490.07 |
| 3,809,191 A | 5/1974 | Woodward | |
| 3,949,958 A | 4/1976 | Richter | |
| 4,162,438 A | 7/1979 | Osder | |
| 4,209,734 A | 6/1980 | Osder | |
| 4,243,358 A | 1/1981 | Carlock et al. | |
| 4,274,808 A * | 6/1981 | Garner et al. | 416/114 |
| 4,362,085 A | 12/1982 | Venuti, Jr. | |
| 4,445,421 A | 5/1984 | Walker et al. | |
| 4,470,569 A | 9/1984 | Shaffer et al. | |
| 4,498,647 A | 2/1985 | Boehringer et al. | |
| 4,637,272 A | 1/1987 | Teske et al. | |
| 4,688,469 A | 8/1987 | Durtschi et al. | |
| 4,688,744 A | 8/1987 | Aldrich | |
| 4,699,043 A | 10/1987 | Violante De Dionigi | |

(Continued)

FOREIGN PATENT DOCUMENTS

EP    0237650 A1    9/1987

OTHER PUBLICATIONS

EP Search Report, 06113746.9 dated May 9, 2006.

*Primary Examiner* — Timothy D Collins
*Assistant Examiner* — Jamie S Stehle
(74) *Attorney, Agent, or Firm* — Ingrassia Fisher & Lorenz, P.C.

(57) ABSTRACT

Electromechanical actuation systems and methods are provided. The electromechanical actuation system includes first, second, and third linear actuators having respective first, second, and third ranges of motion and an output member coupled to the first, second, and third linear actuators such that a position of a selected portion of the output member is based on actuation of the first, second, and third linear actuators.

12 Claims, 12 Drawing Sheets

U.S. PATENT DOCUMENTS

| | | |
|---|---|---|
| 4,759,515 A | 7/1988 | Carl |
| 4,800,798 A | 1/1989 | Boldrin et al. |
| 4,834,319 A | 5/1989 | Ewy et al. |
| 4,905,933 A | 3/1990 | Ako |
| 5,538,202 A | 7/1996 | Thornburg |
| 5,538,209 A | 7/1996 | Bowden et al. |
| 5,628,234 A | 5/1997 | Crook et al. |
| 5,664,539 A | 9/1997 | Vieira |
| 5,678,786 A | 10/1997 | Osder |
| 6,257,528 B1 | 7/2001 | Brislawn |
| 6,257,529 B1 | 7/2001 | Kubo et al. |
| 6,439,512 B1 | 8/2002 | Hart |
| 6,755,375 B2 | 6/2004 | Trikha |
| 6,776,376 B2 * | 8/2004 | Collins ............ 244/213 |
| 7,017,861 B1 * | 3/2006 | Johansson et al. ....... 244/194 |
| 2002/0066614 A1 | 6/2002 | Cole |
| 2004/0075019 A1 | 4/2004 | Collins |
| 2005/0051671 A1 | 3/2005 | Djuric |
| 2005/0116095 A1 | 6/2005 | Cline et al. |
| 2006/0255207 A1 * | 11/2006 | Wingett et al. ........ 244/99.4 |

* cited by examiner

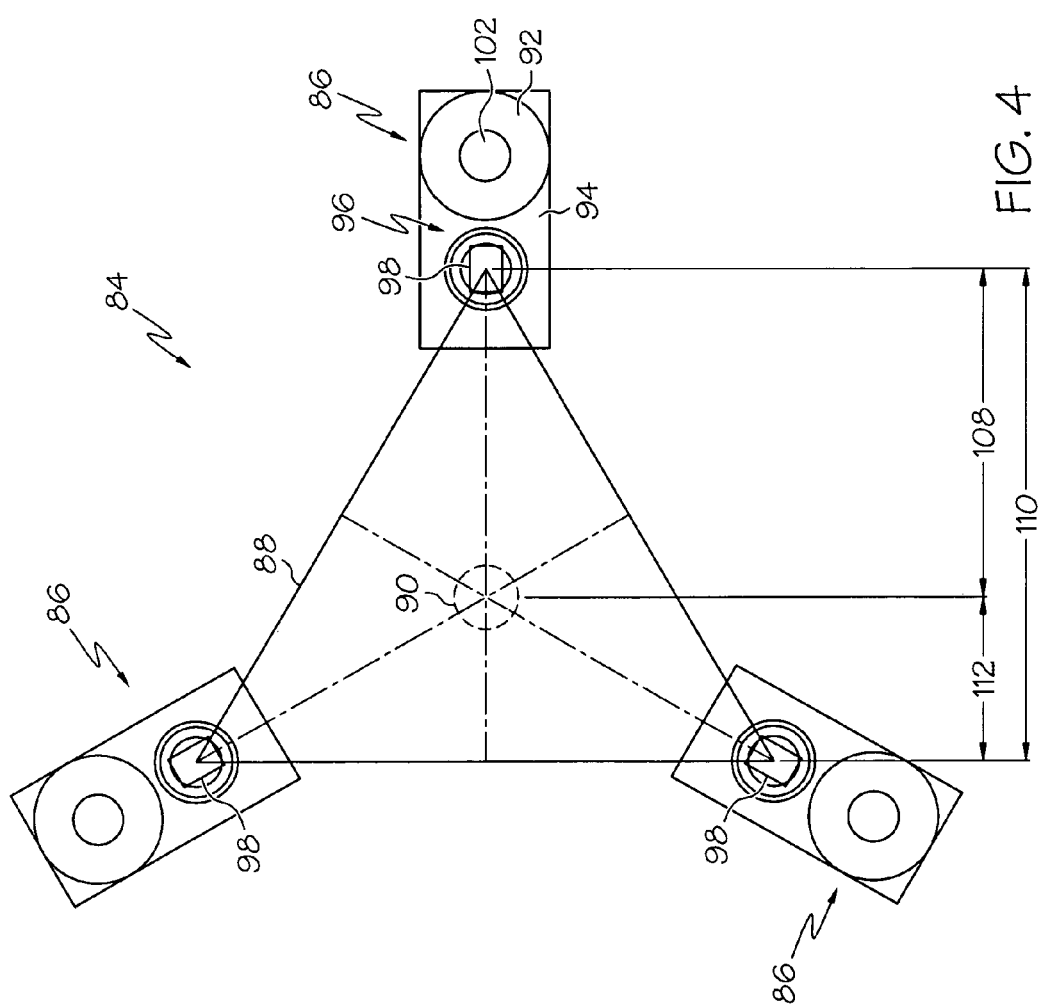

US 8,070,091 B2

ELECTROMECHANICAL ACTUATION SYSTEM AND METHOD

TECHNICAL FIELD

The present invention relates to an electromechanical actuation system, and more particularly, to an electromechanical flight control system and method for rotorcraft.

BACKGROUND

In rotorcraft such as helicopters, the control of the rotors, and other flight control surfaces, is conventionally performed by a series of mechanical interconnections between the flight controls (e.g., a cyclic, a collective, torque pedals, etc.) and the rotors. In modern helicopters, flight control systems typically include a vast collection of mechanical parts such as rods, cables, pulleys and sometimes chains. Additionally, because of the size and power of the vehicles, complex hydraulic circuits, including hydraulic pumps, pipes, valves, and actuators, are also included to assist the pilot in controlling the rotors. Such flight control systems are often referred to as "hydromechanical."

The complexity of modern hydromechanical systems is even further increased when the required redundancy and back-up systems are installed to ensure that the pilot is able to maintain control of the aircraft in the event that the primary flight control system fails. The resulting flight control system requires countless parts and immensely contributes to the overall cost and weight of the helicopter.

Accordingly, it is desirable to provide a flight control system and method for rotorcraft that reduces the number of components in, as well as the overall weight and costs of, the vehicle, while providing the pilot with reliable and redundant control. Furthermore, other desirable features and characteristics of the present invention will become apparent from the subsequent detailed description and the appended claims, taken in conjunction with the accompanying drawings and the foregoing technical field and background.

BRIEF SUMMARY

An electromechanical actuation system is provided. The electromechanical actuation system includes first, second, and third linear actuators having respective first, second, and third ranges of motion and an output member coupled to the first, second, and third linear actuators such that a position of a selected portion of the output member is based on actuation of the first, second, and third linear actuators.

A flight control system for a rotorcraft having a frame and a rotor coupled to the frame is provided. The flight control system includes a flight control device, an electromechanical actuation system, and a control system. The flight control device is configured to receive user input and generate a flight control signal representative thereof. The electromechanical actuation system includes first, second, and third linear actuators having respective first, second, and third ranges of motion, a braking system configured to lock the third linear actuator, and a summing member coupled to the first, second, and third linear actuators such that a selected portion of the summing member moves a predetermined distance when the first, second, and third linear actuators are actuated first portions of the respective first, second, and third ranges of motion and when the third linear actuator is locked by the braking system, the selected portion of the summing member moves the predetermined distance when the first and second linear actuators are each actuated a second portion of the respective first and second ranges of motion, the second portions of the first and second ranges of motion being greater than the first portions of the first and second ranges of motion. The movement of the selected portion of the summing member causes the rotor to move relative to the frame of the rotorcraft. The control system is in operable communication with the flight control device, the first, second and third linear actuators, and the braking system. The controller is configured, in response to receiving the flight control signal, to cause the first, second, and third linear actuators to actuate the first portions of the respective first, second, and third ranges of motion when the third linear actuator is not locked and cause the first and second linear actuators to actuate the second portions of the respective first and second ranges of motion when the third linear actuator is locked.

A method for controlling an electromechanical actuation system is provided. The system includes first, second, and third linear actuators and a summing member interconnecting the first, second and third linear actuators. The first, second, and third linear actuators are actuated first portions of respective first, second, and third ranges of motion thereof to move a selected portion of the summing member a predetermined distance. The third linear actuator is locked in response to detecting a fault condition of the third linear actuator. When the third linear actuator is locked, each of the first and second linear actuators are actuated a second portion of the respective first and second ranges of motion to move the selected portion of the summing member the predetermined distance. The second portions of the first and second ranges of motion are greater than the first portions of the first and second ranges of motion.

BRIEF DESCRIPTION OF THE DRAWINGS

The present invention will hereinafter be described in conjunction with the appended drawing figures, wherein like numerals denote like elements, and in which:

FIG. 4 is a top plan view of the electromechanical actuation system of FIG. 3;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. In this regard, the present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices.

It should be appreciated that the particular implementations shown and described herein are illustrative of the invention and its best mode and are not intended to otherwise limit the scope of the invention in any way. It should also be understood that FIGS. 1-15 are merely illustrative and may not be drawn to scale.

FIG. 1 to FIG. 14 illustrate electromechanical actuation systems and methods. In one embodiment, the electromechanical actuation system includes first, second, and third linear actuators having respective first, second, and third ranges of motion and an output member coupled to the first, second, and third linear actuators such that a position of a selected portion of the output member is based on actuation of the first, second, and third linear actuators.

The electromechanical actuation system may be used within a flight control system for an aircraft, such as a rotorcraft, to provide a redundant control system for flight control surfaces on the aircraft, such as a rotor. In one embodiment, as described below, the electromechanical actuation system includes three linear actuators and is used to control a swash plate used to adjust the rotor on a rotorcraft. With all of the linear actuators within the actuation system operational, each of the linear actuators actuates a first amount to jointly cause the desired movement of the rotor, as caused by the movement of the summing member. If one or more of the linear actuators becomes disabled and locked into position, the operational linear actuators actuate an increased portion of the range of motion thereof to compensate for the lack of movement from the disabled linear actuator. In one embodiment, multiple such actuation systems (e.g., two or more) are used to control the swash plate, with each actuation system having the redundancy as described above, and in greater detail below.

Figure 1:
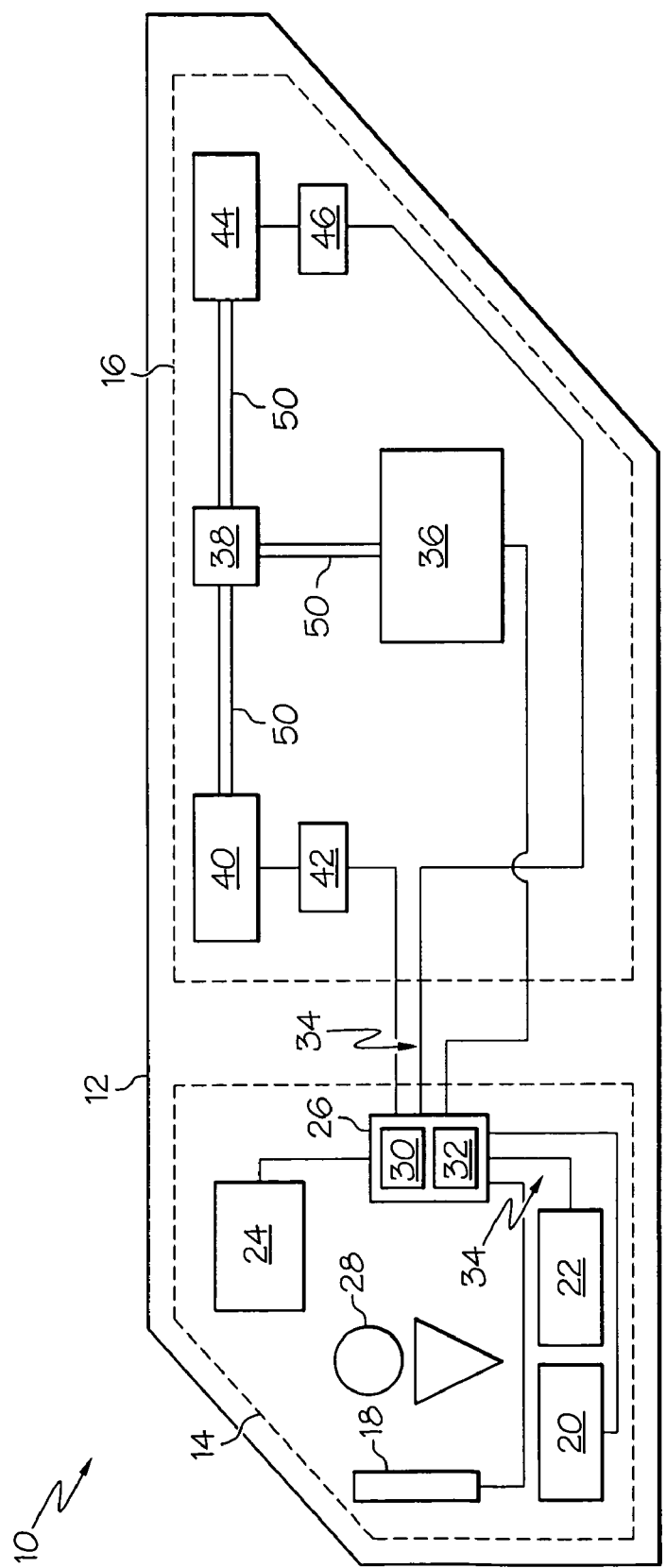
FIG. 1 is a block diagram of a helicopter including a flight deck and a flight system, according to one embodiment of the present invention.

FIG. 1 schematically illustrates a rotorcraft, or helicopter 10, according to one embodiment of the present invention. In the depicted embodiment, the helicopter 10 includes a frame 12, a flight deck (or cockpit) 14, and a flight system 16. The flight deck 14 and the flight system 16 are connected to and/or housed within the frame 12, as is commonly understood. It should be noted that the helicopter 10 is merely exemplary and could be implemented without one or more of the depicted components, systems, and data sources and/or with additional components, systems, and data sources not shown.

Still referring to FIG. 1, the flight deck 14 includes an instrument panel 18, a user interface 20, flight controls 22, a communications and navigation system 24, and a computing system 26. The instrument panel 18 includes various gauges and display devices (e.g., a primary flight display (PFD)) visible to a user (or pilot) 28 of the helicopter 10 and is in operable communication with the computing system 26. The user interface 20 is configured to receive input from the user 28 and, in response to the user input, supply command signals to the communications and navigation system 24 and the computing system 26. The user interface 20 may be any one, or combination, of various known user interface devices including, but not limited to, a cursor control device (CCD), such as a mouse, a trackball, or joystick, and/or a keyboard, one or more buttons, switches, or knobs. Still referring to FIG. 1, the flight controls (or flight control devices) 22, in one embodiment, include a cyclic (or cyclic stick), a collective (or collective lever), yaw control pedals, and a throttle, as is commonly understood. The flight controls are in operable communication with the computing system 26 and configured to receive user input (e.g., manual user input from a pilot) and generate a signal representative of the user input.

The computing system (or processing system) 26 may include any one of numerous known general-purpose microprocessors or an application specific processor that operates in response to program instructions. In the depicted embodiment, the computing system includes on-board random access memory (RAM) 30 and on-board read only memory (ROM) 32 that include instructions stored thereon (or on another computer-readable medium) for carrying out the processes and methods described below. Although not shown, the computing system 26 may also include a "flight control computer," as is commonly understood. The program instructions that control the computing system 26 may be stored in either or both the RAM 30 and the ROM 32. For example, the operating system software may be stored in the ROM 32, whereas various operating mode software routines and various operational parameters may be stored in the RAM 30. It will be appreciated that this is merely exemplary of one scheme for storing operating system software and software routines, and that various other storage schemes may be implemented. It will also be appreciated that the computing system 26 may be implemented using various other circuits, not just a programmable processor. For example, digital logic circuits and analog signal processing circuits could also be used. The computing system 26 is in operable communication with the other components on the flight deck 14 via a data bus (or avionics bus) 34.

Still referring to FIG. 1, the flight system 16 includes an engine system 36, a transmission system 38, a forward rotor assembly 40, forward rotor controls 42, an aft rotor assembly 44, and aft rotor controls 46. In one embodiment, as shown in the embodiment depicted in FIG. 2, the engine system 36 includes one or more turbine engines 48 (FIG. 9), each of which includes a turbo machinery casing having a substantially cylindrical shape and covering various turbo machinery components, such as a shaft and various disks (e.g., compressors and turbines) connected to the shaft, as is commonly understood in the art.

Figure 9:
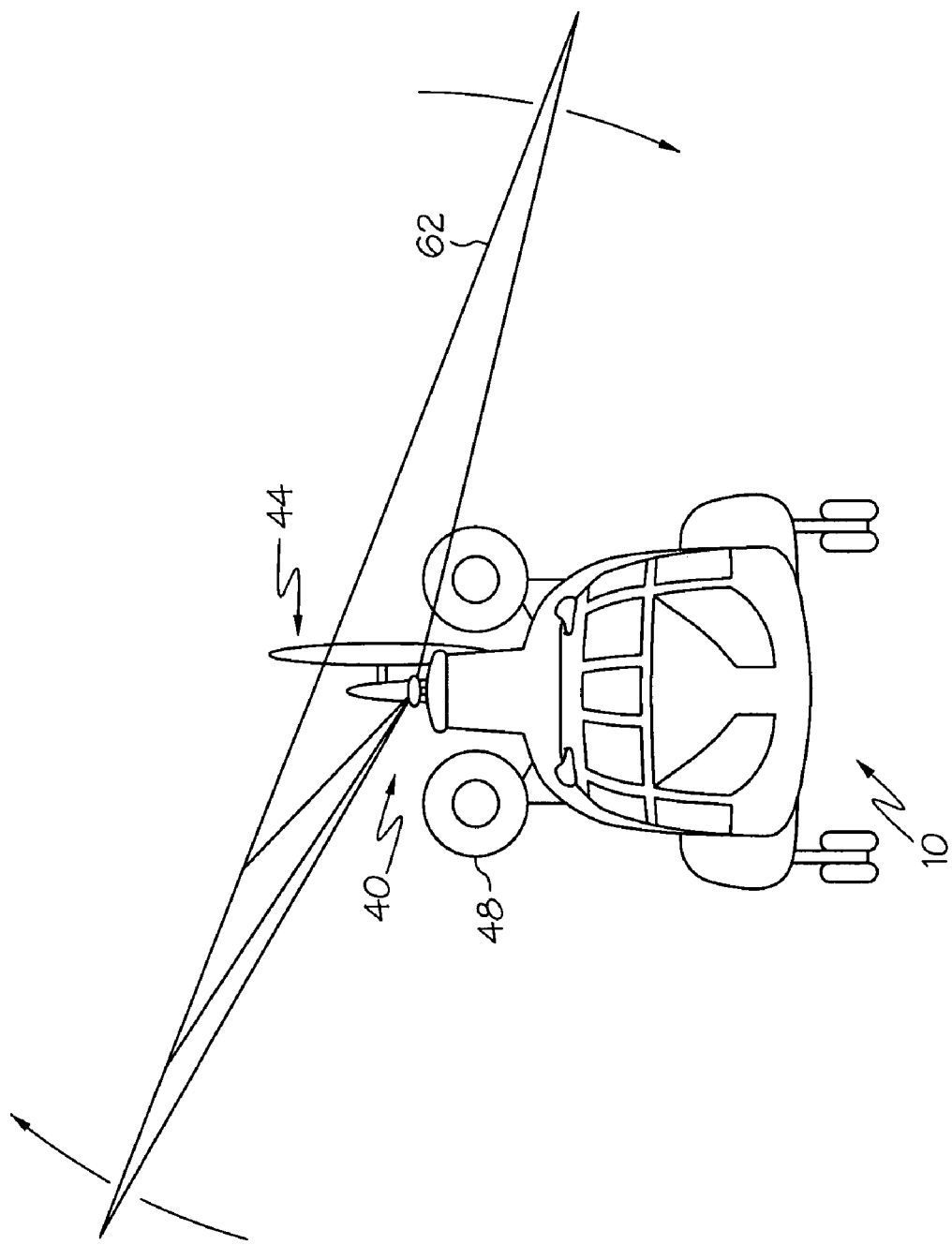
FIG. 9 is a front view of the helicopter of FIG. 1, illustrating movement of a rotor thereof.

Although not shown, the transmission system 38 includes a combining transmission, a forward transmission, and an aft transmission, as are well known in the art. The rotor assemblies 40 and 42 are coupled to the engine system 36 through the transmission system 38 via various drive shafts 50. In the depicted embodiment, the forward rotor assembly 40 is a "main" rotor assembly, and the aft rotor assembly 42 is a "tail" rotor assembly, as depicted in FIG. 9.

Figure 2:
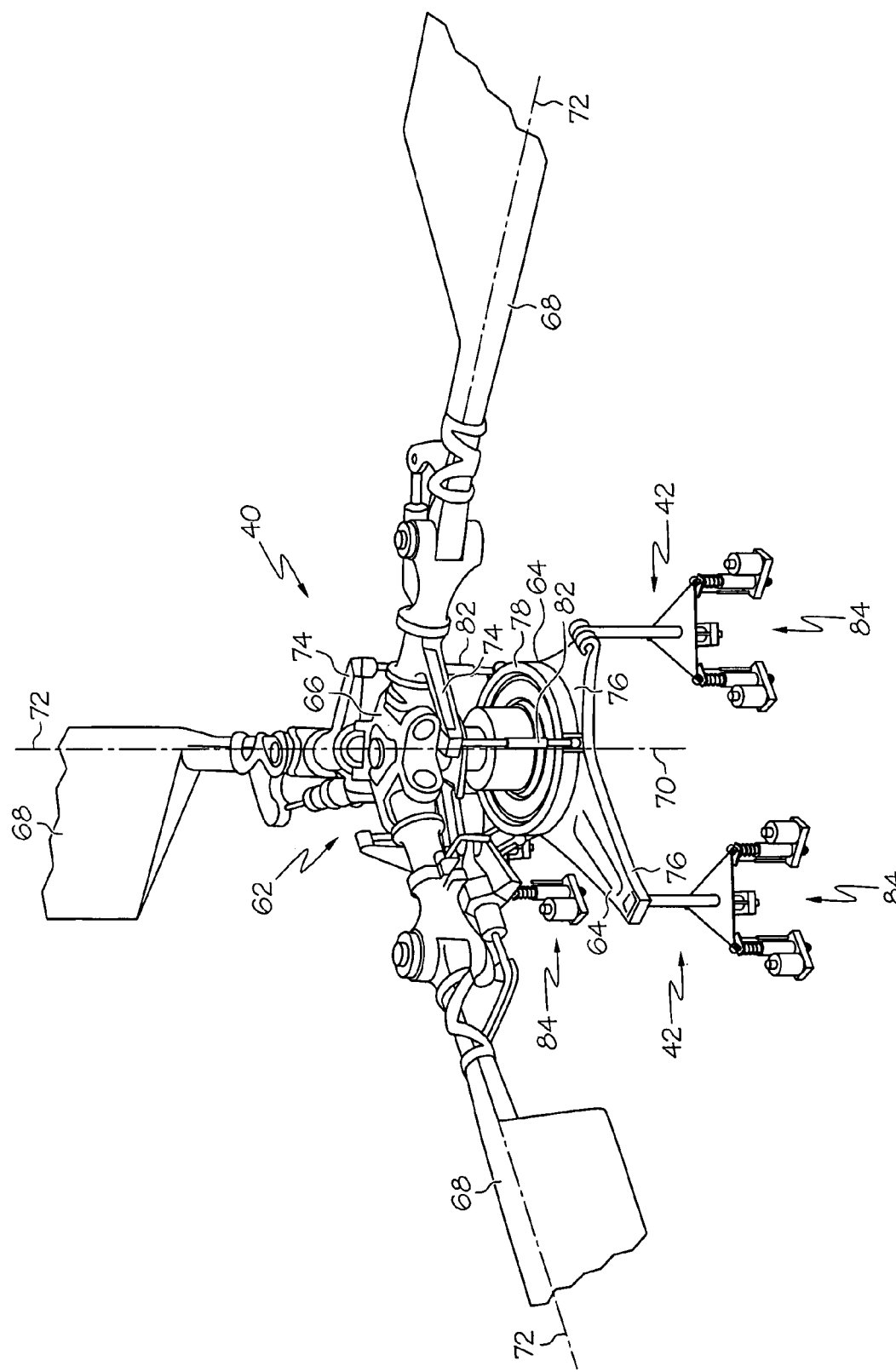
FIG. 2 is an isometric view of a rotor assembly, having a rotor and rotor controls, within the helicopter of FIG. 1.

FIG. 2 illustrates the forward rotor assembly 40 and forward rotor controls 42 in greater detail. The forward rotor assembly 40 includes a rotor 62 and a swash plate 64. The rotor 62 includes a hub 66 and multiple rotor blades 68. Although not shown, the hub 66 is coupled to the transmission system 38 through a vertical driveshaft to rotate about a vertical axis 70, as well as tilt relative to the vertical axis 70, as is described below. Also as described below, each of the rotor blades 68 is coupled to the hub 66 to rotate, or "pitch," about horizontal axes 72, each of which substantially intersects the vertical axis 70. Each blade 68 includes a pitch arm 74 extending therefrom at a central portion thereof.

The swash plate 64 includes a non-rotating portion 76 and a rotating portion 78 which jointly form a shaft opening through which the vertical driveshaft extends. The rotating portion 78 is rotatably coupled to the non-rotating portion 76 and connected to the pitch arms 74 on the blades 68 by swash plate arms 82.

Referring to FIG. 2, the forward rotor controls 42 include three electromechanical actuation assemblies (or systems) 84 arranged below a periphery of the swash plate 64. In one embodiment, two of the actuation assemblies 84 are respectively located on the starboard and port sides of the rotor assembly 40, while the third actuation assembly is on an aft side of the rotor assembly 40.

Figure 3:
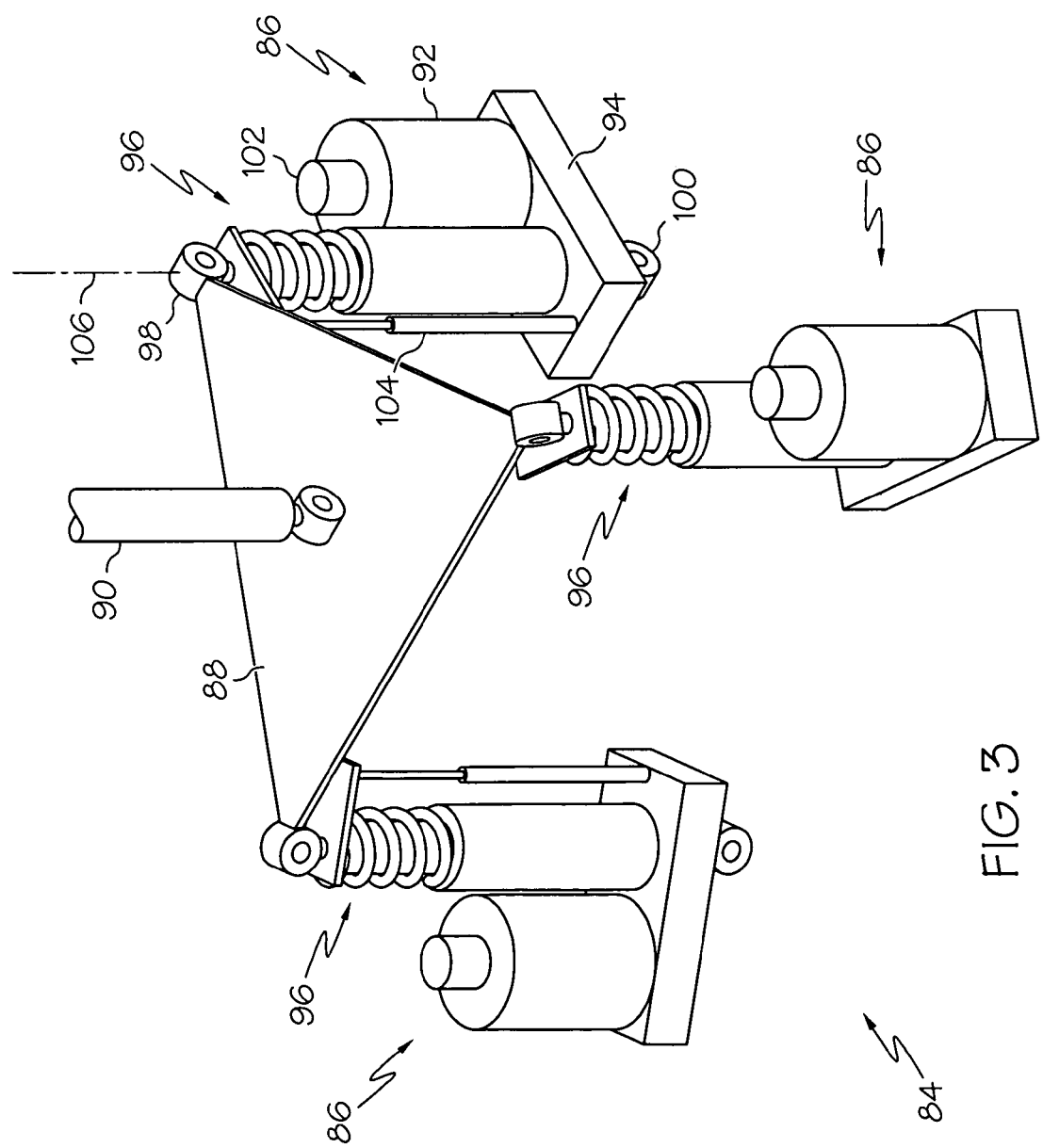
FIG. 3 is an isometric view of an electromechanical actuation system within the rotor controls of FIG. 2, according to one embodiment of the present invention.

FIGS. 3 and 4 illustrate one of the actuation assemblies 84 in greater detail. The actuation assembly 84 includes three linear actuators 86, a summing (or output) plate (or member) 88, and a swash plate rod 90. In the depicted embodiment, each of the linear actuators 86 includes an electric rotary motor 92, a gear box 94, a ballscrew 96, upper and lower bearings 98 and 100, a resolver 102, and a linear variable differential transformer (LVDT) 104. Although not shown, the rotary motor 92 includes a stator, having plurality of conductive coils, and a rotor, with the one or more ferromagnetic cores, which may jointly form a plurality of electromagnetic poles, as is commonly understood.

The gearbox 94 interconnects the rotary motor 92 and a lower end of the ballscrew 96 and, although not shown, includes a plurality of gears to alter a rotational speed generated by the rotary motor 92 before being translated into a linear action by the ballscrew 96. Operation of the rotary motor 92 causes the ballscrew 96 to translate along an actuation axis, or direction, 106. It should be noted that there are several architectures possible for the actuators 86 (e.g., driving the nut to translate the screw or driving the screw to cause the nut to translate). An upper end of the ballscrew 96 is connected to the summing plate 88 through the upper bearing 98. Although not shown, the linear actuator 86 is coupled to the frame 12 of the helicopter 10 through the lower bearing 100 (e.g., a spherical bearing). In order to make the entire assembly kinematically stable (i.e. so the entire assembly does not rotate as a four-bar link), the summing plate 88 may be restricted from rotating about an axis in the plane formed by the three actuator fixed attachment points 100 and/or rotating about the centerline of the swash plate rod 90. Examples of limiting the assembly's degrees of freedom as described may be accomplished by a guide on the swash plate rod 90 that includes a means for anti-rotation. Numerous other combinations of restricting the degrees of freedom are possible. The example given is for illustrative purposes only.

The resolver 102 is coupled to the rotary motor 92 and is configured to detect the position of the rotor within the rotary motor 92. As is commonly understood, the resolver 102 is used to synchronize the commutation of the current provided to the rotary motor 92 with the relative positions of the stator and rotor within the rotary motor 92. It should be understood that other devices for measuring the position of the rotor within the rotary motor may be used, such as a Hall Effect sensor.

The LVDT 104 includes a sleeve connected to the gearbox 94 and a ferromagnetic rod connected to an upper end of the ballscrew 96. In one embodiment, the sleeve includes a plurality of solenoidal coils through which the rod passes as the linear actuator 86 is actuated. The LVDT 104 may or may not be redundant. It should be understood that other devices may be used for measuring the linear output position of the linear actuators 86, such as a potentiometer or an encoder.

In one embodiment, the linear actuator 86 is configured to be a "non-backdriveable" actuator. That is, in such an embodiment, the linear actuator 86 automatically becomes locked in position when no power is provided. In other embodiment, the linear actuator 86 includes a brake mechanism (e.g., integral with the ballscrew 96) that mechanically locks the linear actuator. It should be noted that, in at least one embodiment, all three of the linear actuators 86 are substantially identical.

Referring specifically to FIG. 4, in the depicted embodiment, the summing plate 88 is substantially triangular in shape and at each corner is coupled to the linear actuators 86 through the respective upper bearings 98 at each corner thereof. In the example shown, the summing plate 88 is in the shape of an equilateral triangle such that the linear actuators 86 are equally spaced apart. Moreover, the distances between each of the linear actuators 86 and a central portion of the summing plate 88, as indicated by the position of the swash plate rod 90, are all substantially equal. As is also indicated in FIG. 4, a distance 108 between the corners of a summing plate 88 and the center of the summing plate is approximately two-thirds of the distance 110 between the corners and respective opposing sides of the summing plate 88. As such, a distance 112 between the center of the summing plate and the side from the opposing corner is approximately one-third of the distance 110. It should be noted that the shape of the summing member 88 may different than the symmetric, triangular shape shown in FIG. 4. However, the symmetry provided in the depicted embodiment allows for all three linear actuators to be identical.

Figure 7:
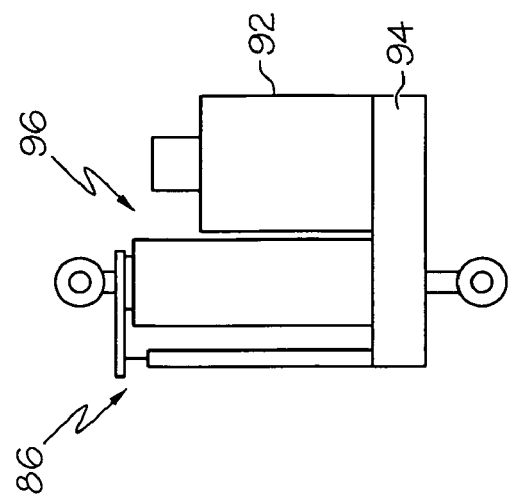
FIGS. 5-7 are side views of a linear actuator within the electromechanical actuation system of FIG. 3, illustrating various actuation positions thereof.
Figure 6:
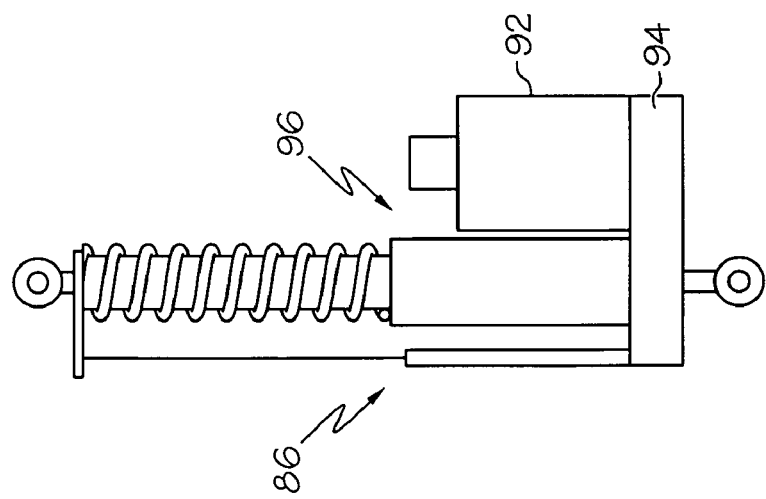
Figure 5:
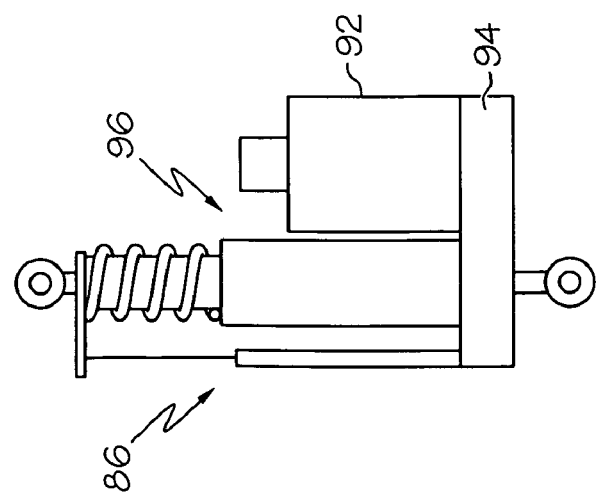

FIGS. 5, 6, and 7 illustrate the range of motion of the linear actuator 86. In particular, FIG. 5 illustrates the ballscrew 96 at an exemplary mid-position between minimum and maximum limits of the range of motion of the linear actuator 86. The position of the ballscrew 96 shown in FIG. 5 may also represent an exemplary position of the ballscrew 96 after being locked. FIG. 6 illustrates the linear actuator 86 with the ballscrew 96 any fully extended position (i.e., a maximum limit of the range of motion). FIG. 7 illustrates the linear actuator 86 with the ballscrew 96 in a fully retracted position (i.e., a minimum limit of the range of motion). Although FIGS. 5-7 only illustrate three positions, it should be understood that the ballscrew 96 may be moved into numerous other positions between those shown.

During operation, referring to FIGS. 1 and 2, the engine system 36 provides power to the forward and aft rotor assemblies 40 and 44 through the transmission system 38 and the drive shafts 50, causing the rotors to rotate, thus generating lift and allowing the helicopter 10 to fly, as is commonly understood. Referring to FIG. 1, to control the helicopter 10, the user 28 provides input to the flight controls 22 from which command signals are sent to the computing system 26. The computing system 26 translates the command signals into appropriate reactions taken by the forward and aft rotor controls 42 and 46.

Generally, control of the helicopter 10 (e.g., with regard to the main rotor assembly 40) is accomplished by tilting the swash plate 64 using the actuation assemblies 84. Referring again to FIG. 1, upon receiving a command signal from the flight controls, such as a cyclic stick, a collective lever, and/or a rudder pedal (i.e., generated in response to manual input from the pilot), the computing system 26 generates a control signal which is sent to the rotor controls 42 and controls the actuation assemblies 84 as described below.

Figure 8:
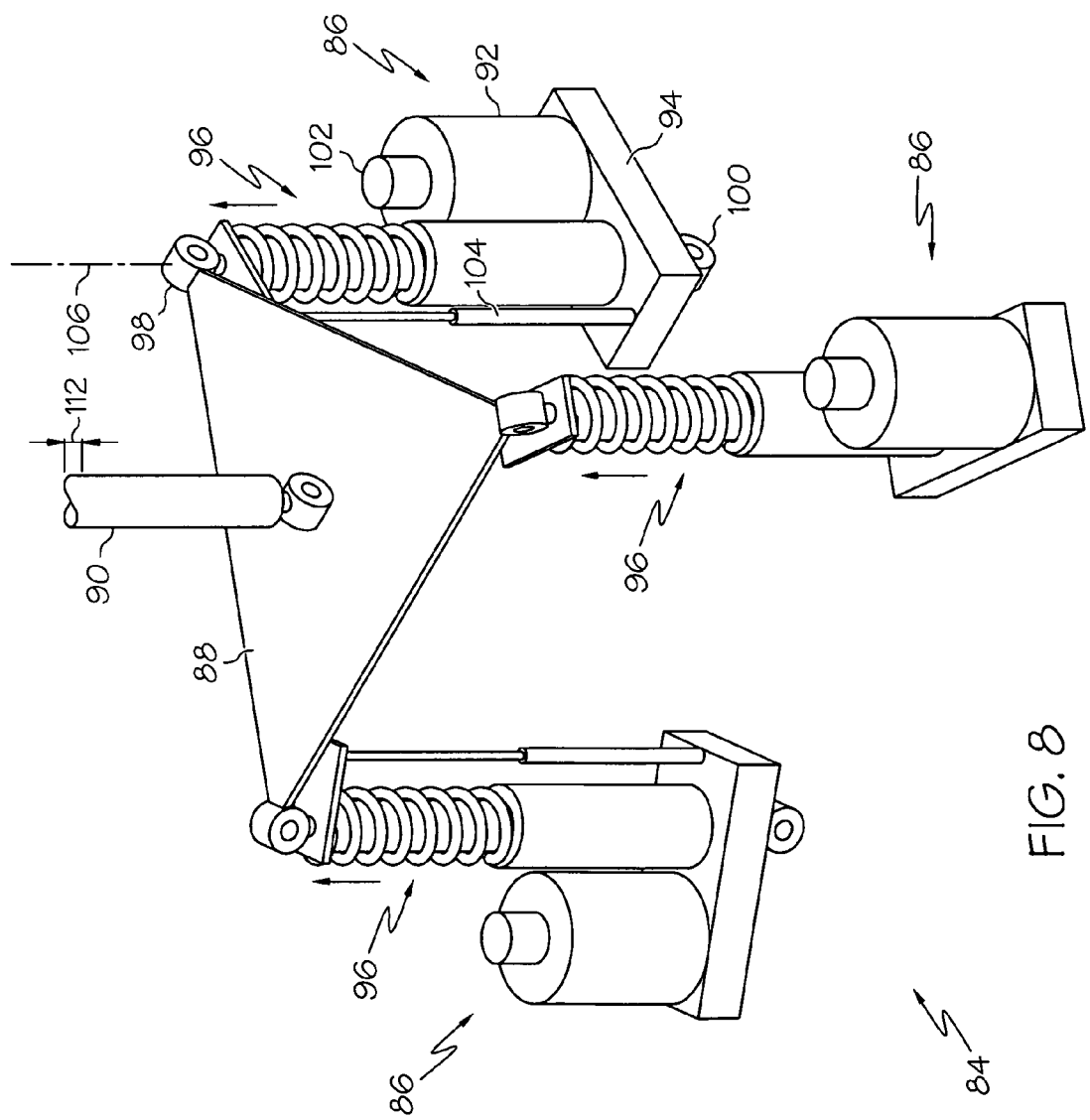
FIG. 8 is an isometric view of the electromechanical actuation system of FIG. 3, illustrating one mode of operation thereof.

FIG. 8 illustrates the actuation assembly 84 (or one of the actuation assemblies 84) after the ballscrew 96 on all three of the linear actuators 86 has been further extended a distance 112 from their respective positions shown in FIG. 3, or a first portion of the range of motion of the linear actuators 86. As such, the summing plate 88 has been uniformly moved upwards a distance 112, as has the swash plate rod 90 (and the center portion of the summing plate 88).

The distance 112, in this case, due to the particular geometry shown in FIGS. 4 and 8, is equal to the sum of one-third of the motion from each actuator. That is, if each actuator 86 actuates (or moves) 1 centimeter (cm), then the swash plate rod 90 will move [(⅓×1 cm+(⅓×1 cm)+(⅓×1 cm)]=1 cm. If one actuator does not move and the other two move 1 cm each, then the swash plate rod 90 will move [(⅓×0 cm)+(⅓×1 cm)+(⅓×1 cm)]=⅔ cm. Thus, if only two actuators are operable, their individual strokes must be increased by a factor of 3/2 (or 1.5) to get the same swash plate rod 90 output as when all three actuators were operable. In this example with one actuator being inoperable, the stroke of the two remaining actuators is increased to 3/2 cm, giving a swash plate rod output 90 of [(⅓×0 cm)+(⅓×3/2 cm)+(⅓×3/2 cm)]=1 cm. In this regard, the operation of the actuation assembly 84 is further described below.

Referring to FIGS. 2, 8, and 9, as the swash plate rod 90 is moved upwards, the swash plate 64 is moved relative to the frame 12 of the helicopter 10. It should be noted that movement of the swash plate 64 may refer to the swash plate 64 tilting relative to a longitudinal axis of the helicopter 10 and/or moving perpendicularly to the longitudinal axis. The interconnection between the swash plate 64 and the rotor 62 shown in FIG. 2 (e.g., through the swash plate arms 82), results in the hub 66 and/or the blades 68 moving (e.g., tilting, raising, lowering etc.) with the swash plate 64. Movement of the rotor 62, hub 66, and/or blades 68 may refer to the rotor 62 being tilted by movement of the swash plate 64 and/or the pitch of the blades 68 being altered by movement of the swash plate 64. In the example shown in FIG. 9, the main rotor assembly 40 is tilted to the helicopter's 10 port side. Through various combinations of movements of the swash plates 64, the helicopter 10 may be maneuvered in virtually any manner desired.

In the event that one of the linear actuators 86 loses power, and/or a fault condition of the operation of one of the linear actuators 86 is detected, the particular linear actuator 86 is locked in position (e.g., by the non-backdriveable nature of the linear actuator 86 or the brake mechanism), such as that shown in FIG. 5. However, the swash plate rod 90 may still be moved a distance 112, as described below. It should be noted that in the remainder of the description, operating linear actuators will be continued to be referenced by numeral "86" while non-operational/disabled/locked linear actuators will be referenced by numeral "113."

Figure 10:
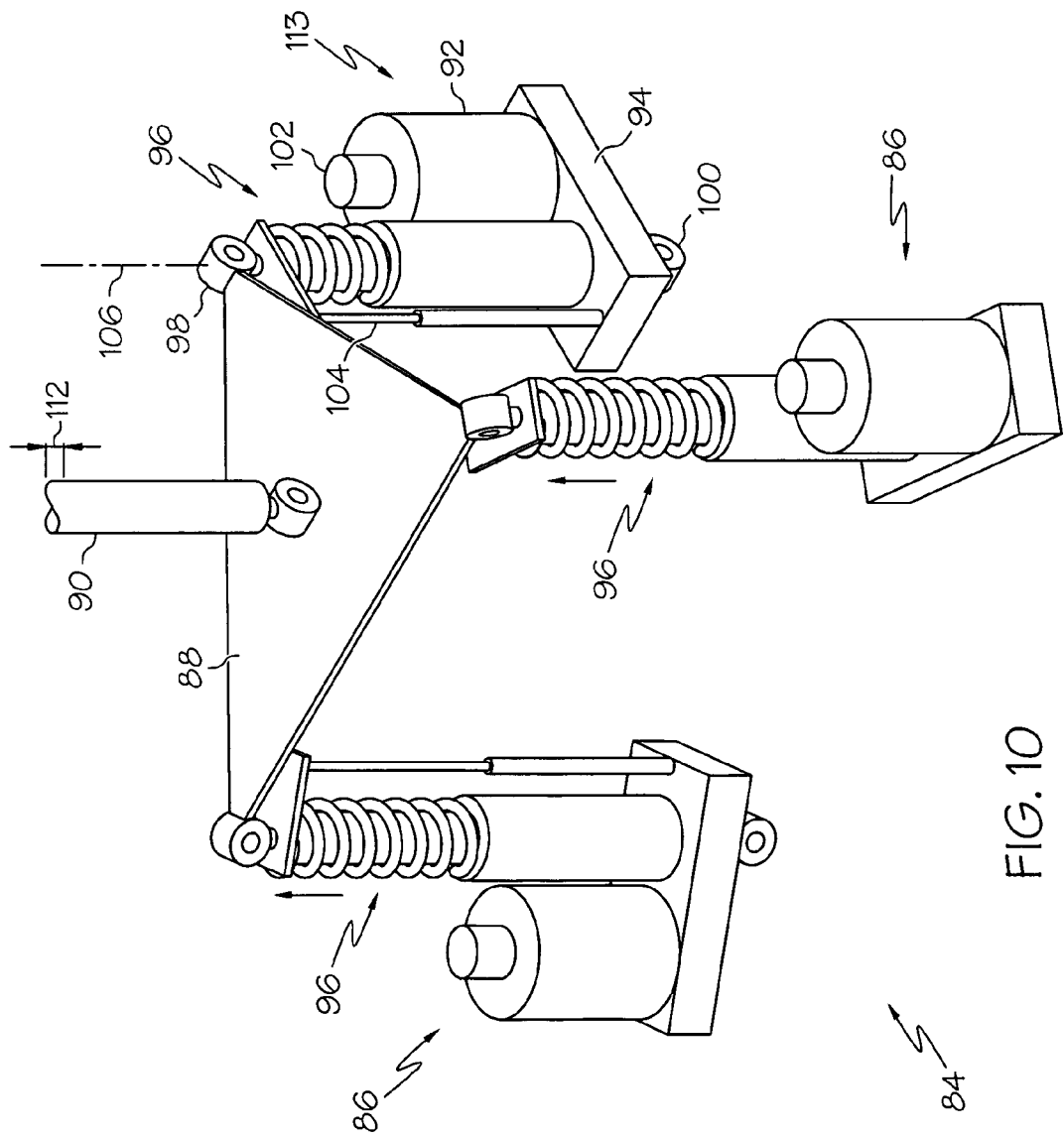
FIG. 10 is an isometric view of the electromechanical actuation system of FIG. 3, illustrating a second mode of operation thereof.

Referring now to FIG. 10, with linear actuator 113 (e.g., on the right side of the drawing) locked in place, the actuation distances of operational linear actuators 86 is increased to compensate for the lack of actuation from linear actuator 113. The gain of the control, as sensed by the pilot, may also be maintained by increasing the actuation speed of the respective ballscrews 96 thereof. As shown in FIG. 10, the two operating linear actuators 86 (e.g., on the left side of the drawing) have been actuated a distance greater than that shown in FIG. 5. That is, the operating linear actuators 86 have been actuated a second portion (greater than the first) of the range of motion of the linear actuators 86. In particular, due to the geometry of the swash plate 64 described above, the two operating linear actuators 86 actuate a distance three-halves (i.e., 1.5 times) that of the distance ballscrews 96 were actuated with all three of the linear actuators 86 operating (FIG. 8). The result of such a motion is that the swash plate rod 90 is moved upwards by the same distance 112 depicted in FIG. 8. It should be noted that because linear actuators 113 is not operating, the summing plate 88 may experience some tilting. As such, the path along which the swash plate rod 90 is moved may not be a completely straight line but rather be slightly curved, unless otherwise constrained.

In the event that two of the linear actuators 86 lose power, and/or a fault condition of the operation of two of the linear actuators 86 is detected, the two particular linear actuators 86 are locked in position (e.g., by the non-backdriveable nature of the linear actuators 86 and/or the brake mechanism), such as that shown in FIG. 5. However, the swash plate rod 90 may still be moved the distance 112, as described below.

Figure 11:
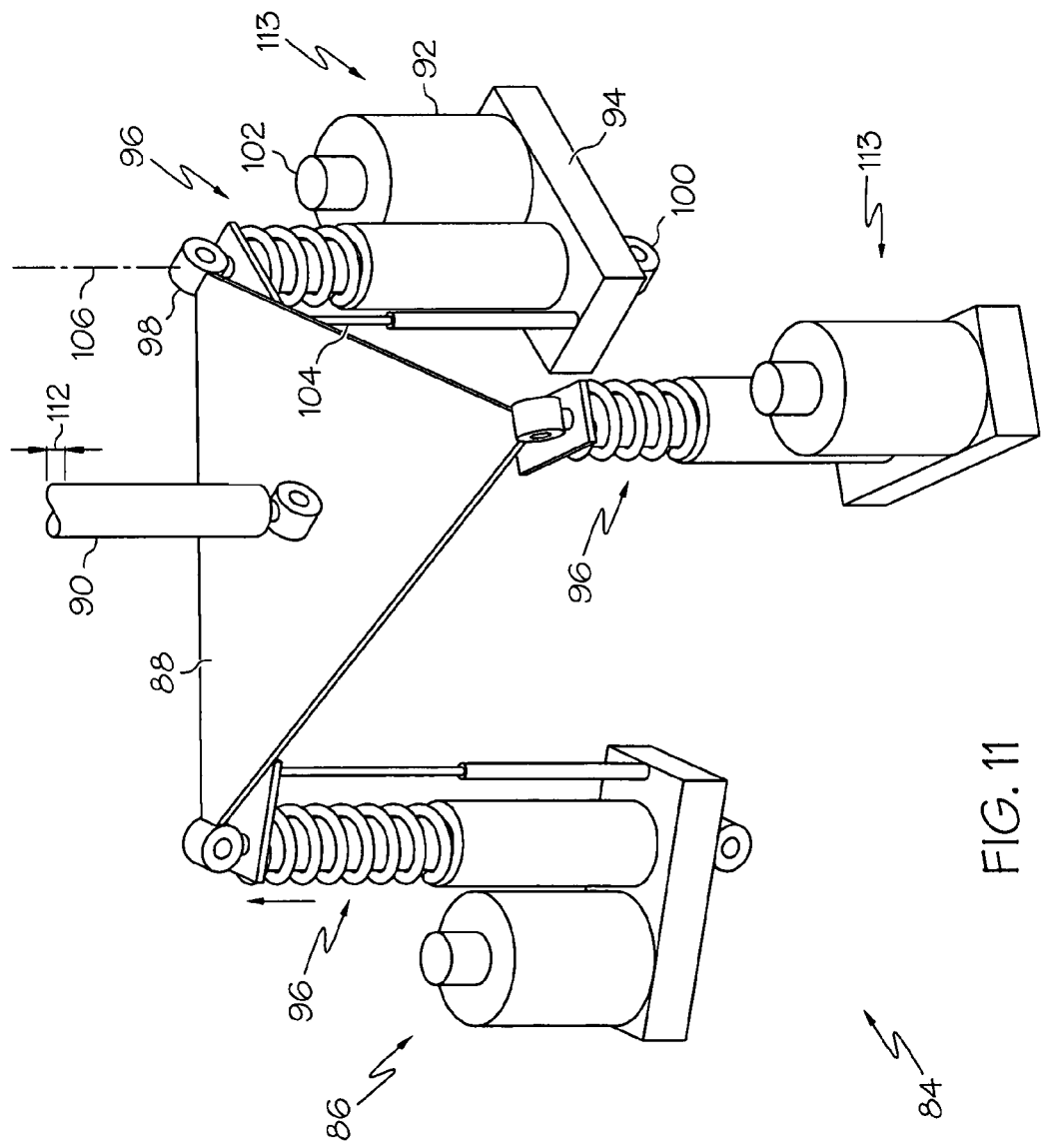
FIG. 11 is an isometric view of the electromechanical actuation system of FIG. 3, illustrating a third mode of operation thereof.

Referring now to FIG. 11, with linear actuators 113 (e.g., on the right side and at the bottom of the drawing) locked in place, the actuation distance of the third linear actuator 86 is increased to compensate for the lack of actuation from the disabled linear actuators 113, such as by increasing the actuation speed of the respective ballscrew 96 thereof. As shown in FIG. 11, the remaining operating linear actuator 86 (e.g., at the left-front of the drawing) has been actuated a distance greater than that shown in FIGS. 8 and 10. That is, the operating linear actuator 86 has been actuated a third portion (greater than the first and second portions) of the range of motion of the linear actuator 86. In one embodiment, the third portion of the range of motion of the linear actuator 86 covers the entire range of motion. In particular, due to the geometry of the summing plate 88 described above, the remaining operating linear actuator 86 actuates a distance that is tripled (i.e., 3 times) compared to the distance the respective ballscrew 96 was actuated with all three of the linear actuators 86 operating.

Still referring to FIG. 11, the result of such a motion is that the swash plate rod 90 is moved upwards by the same distance 112 as it was in FIGS. 8 and 10. In the event that only one of the linear actuators 86 is operable, the tilting experienced by the summing plate 88 may be increased. However, such tilting may be compensated for in the change of the actuation distances of the ballscrews 96. Although the above description refers to the ballscrews 96 only be moved upwards, the operation of the actuation assembly 84 may be similarly controlled when it is desired to move the summing plate 88 downwards.

As a result, each of the actuation assemblies 84 is provided with a triple-redundancy in that the actuation assemblies 84 are fully operational with one, two, or three of the linear actuators 86 operating. Thus, the user 28 may retain full control of the swash plate 64, and thus the rotor 62, even if only one of the linear actuators 86 within each of the three of the actuation assemblies 84 is operable. Another advantage of the system described above is that the helicopter is controlled via electric actuators (i.e., "fly-by-wire") instead of conventional, mechanical or hydromechanical systems. As a result, the flight control system provided greatly reduces the number of components used in the manufacturing of the helicopter. Thus, manufacturing costs are also reduced. Additionally, the reduction in components reduces the overall weight of the helicopter, which reduces operational costs (e.g., fuel savings) and improves performance.

Figure 12:
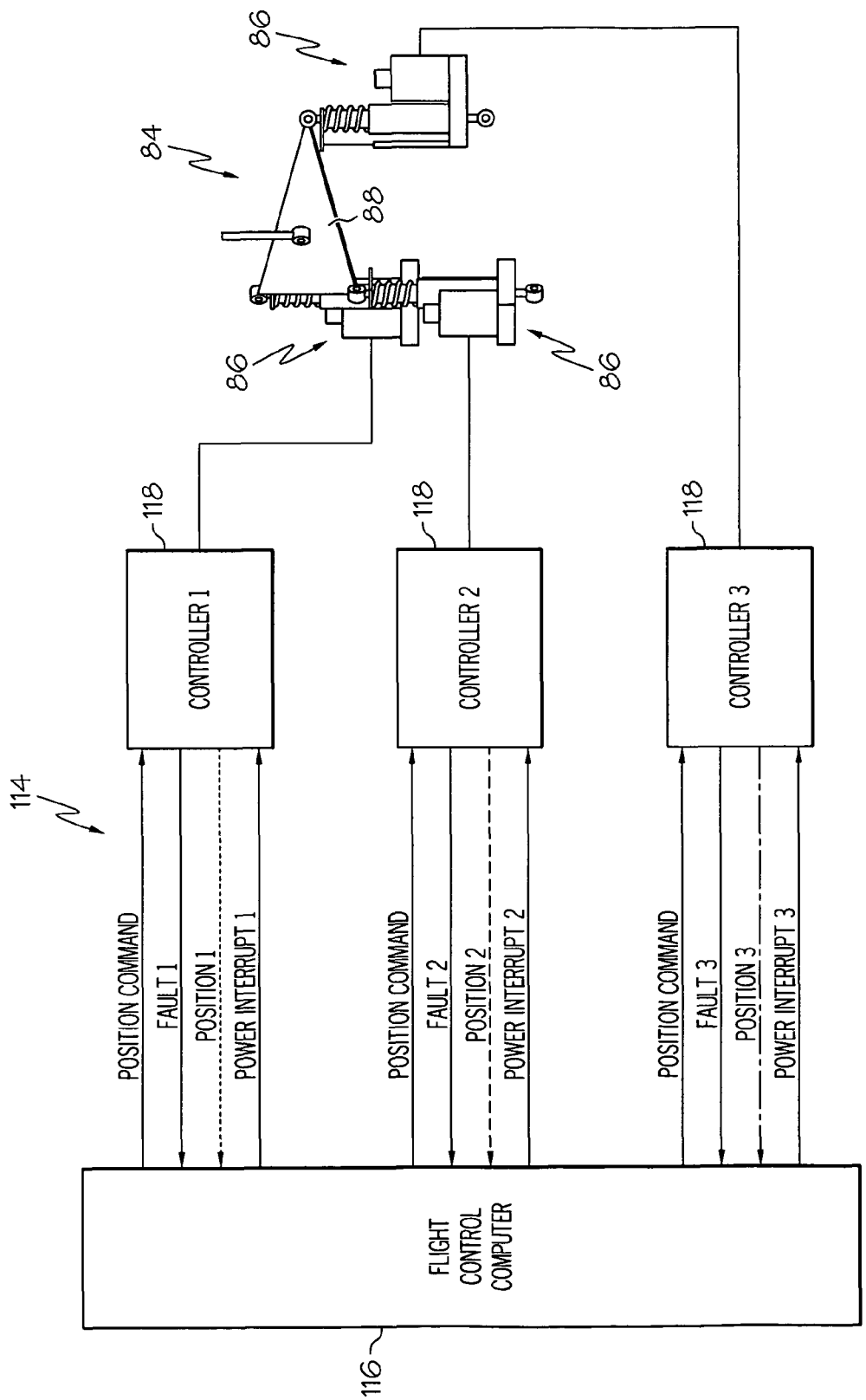
FIGS. 12-14 are block diagrams of control systems and/or methods for the electromechanical actuation system of FIG. 3, according to various embodiments of the present invention.
Figure 13:
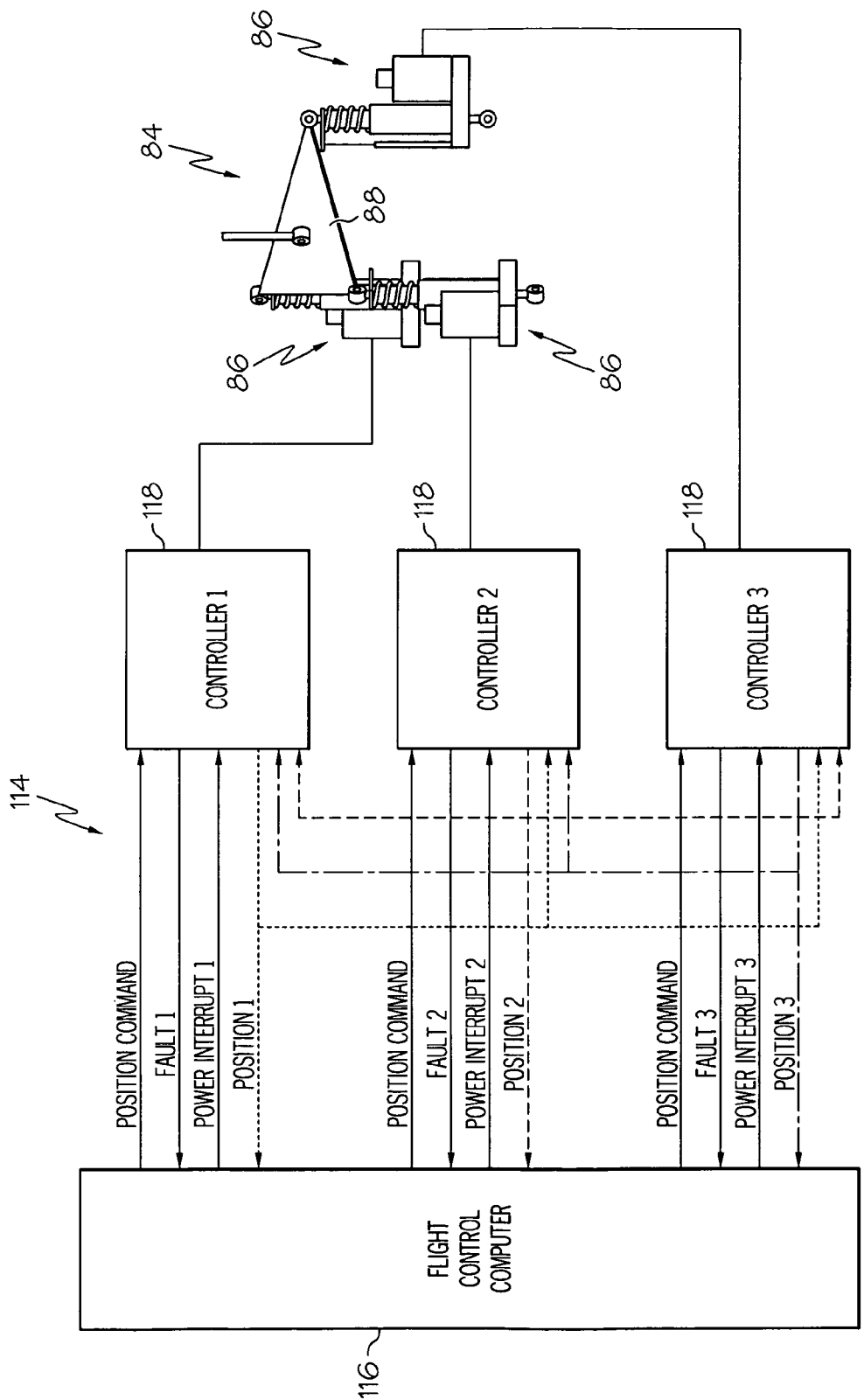
Figure 14:
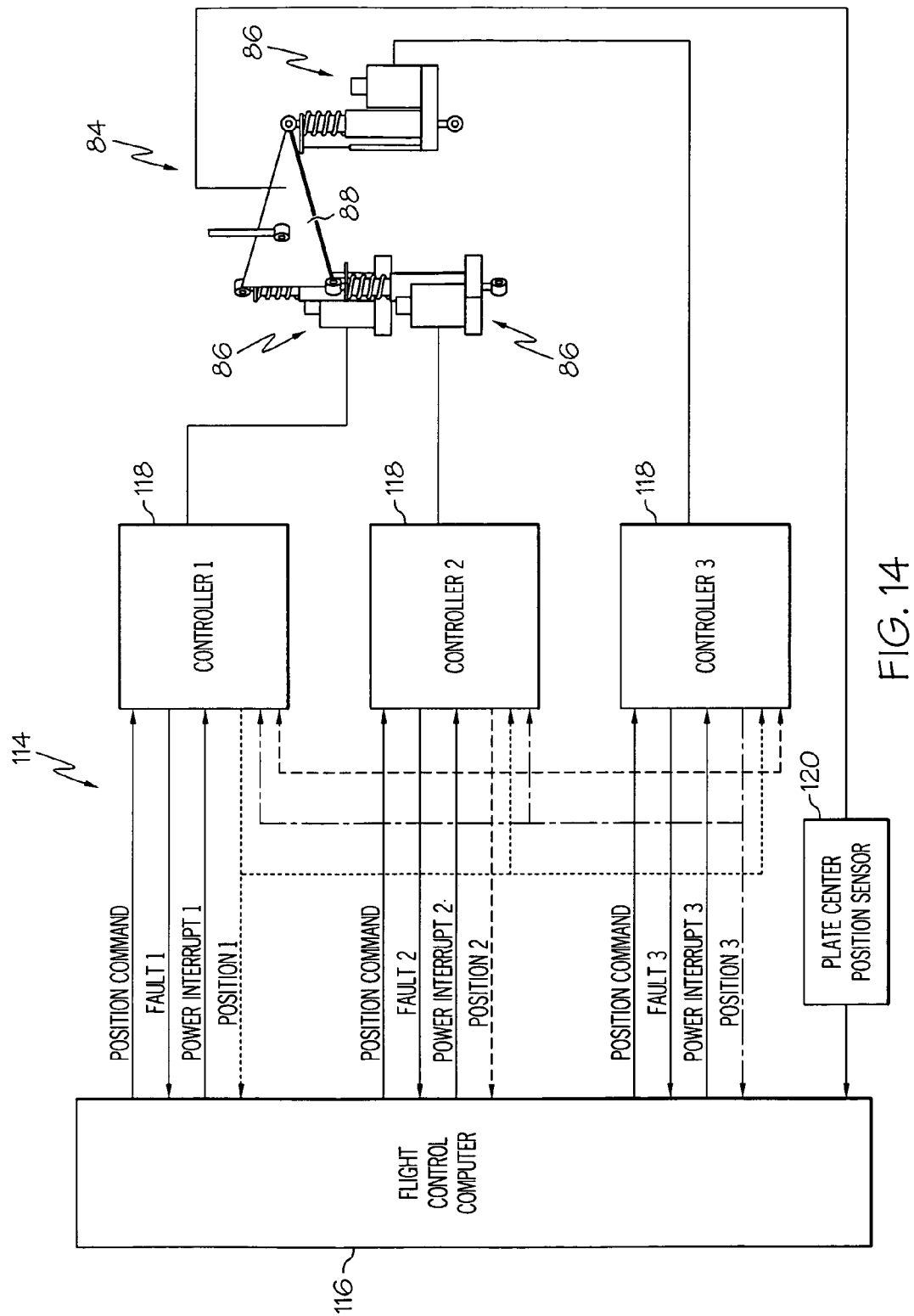

FIGS. 12-14 illustrate various fault management systems (and/or methods) 114 that may be used in the operation of the actuation assemblies 84 and flight control system described above. It should be understood that variations of fault logic different from those illustrated may be used, and hybrid logics between those illustrated may be utilized. The examples given are meant for illustrative purposes only.

In the embodiment shown in FIG. 12, a flight control computer (or flight computer) 116 is in operable communication with three actuator controllers 118 (e.g., one for each of the linear actuators 86), both of which may be integral with the computing system 26 (FIG. 1). As shown, each of the actuator controllers 118 is in operable communication with a respective one of the linear actuators 86 within an actuation assembly 84. As such, although not shown, when used in conjunction with the swash plate as described above, the entire fault management system may include a total of nine such actuator controllers 118. The flight control computer 116 sends appropriate command signals to the controllers 118 indicating the desired position or movement of, for example, the central portion of the summing plate 88 (e.g., a position command). Each of the controllers 118, in one embodiment, utilizes a signal from the LVDT 104 on the respective linear actuator 86 to determine an actual position of the respective ballscrew 96 relative to the commanded, or desired, position of the ballscrew 96. If the difference between the two exceeds a predetermined threshold, the controller 118 sends a signal to the flight control computer 116 representative of a fault condition (e.g., a fault signal) for that particular linear actuator 86, as well as a signal representative of the detected position (e.g., position signal). Based on the information received from the controllers 118, the flight control computer 116 disables the controllers 118 (and/or linear actuators 86) and adjusts the movements of the remaining linear actuator(s) 86 in a manner similar to that described above. This invention places no limitation on the design of the flight computer, as the flight computer may itself have multiple channels, which may in turn communicate to one or several of the actuator controllers 118.

The embodiment of the fault management system 114 shown in FIG. 13 is similar to that shown in FIG. 12. However, each of the controllers 118 provides a position signal to the other controllers 118, as well as to the flight control computer 116 Each actuator controller 118 calculates the position of the center of the plate 88 based on the health status of the other controllers 118. Each controller 118 may disable itself upon detection of a fault. Each healthy controller 118 adjusts the commanded stroke and rate gain, when the failed controller removes itself from membership. This approach utilizes the ability of each controller 118 to self-diagnose any failure that cannot be detected by the flight computer 116. Any remaining faults may be detected by the flight computer 116, which may turn off the output power from the controller 118 to the linear actuator 86.

The embodiment of the fault management system 114 shown in FIG. 14 utilizes a sensor 120 to provide a signal that indicates the position of the center of the summing plate 88 to the flight control computer 116. In such an embodiment, the individual controllers 118 may not disable themselves. Rather, the flight control computer 116 may disable each of the actuator controllers 118 based on the fault signal generated by that respective controller 118, the position signals of the other controllers 118, and the position signal generated by the plate sensor 120. The additional position sensor 120 at the middle of the summing plate 88 allows additional arbitration of the plate center position calculated by each individual controller 118. If one actuator 86 or controller 118 has already failed, the flight computer 116 may arbitrate between the remaining two actuators 118, in case of a second failure. The plate center position sensor 120 may also provide an initialization value for a controller in the case of a reset, allowing controllers 118 to rejoin membership.

As an alternative in FIG. 14, instead of co-location of each LVDT or other linear position indication on the actuator, all the LVDTs may be located at the center of the summing plate 88, or each controller may share a common sensor at the center of the plate. For center of the plate position feedback, the fourth LVDT 120 may be used to allow the flight computer 116 to arbitrate in the case that one actuator 86 has already failed and a second actuator 86 has failed because of an errant position signal.

Although the actuation assemblies 84 are shown above as directly moving the swash plate 64, in other embodiments, the actuation assemblies 84 may control the operation of a servocylinders, as are commonly understood, that control the movements of the swash plate 64. Although not shown, such servocylinders may include one or more hydraulic cylinders having a barrel (or housing) and piston within a housing, with a piston rod extending through an opening in the housing. As is commonly understood, the piston is moved within the housing by pumping fluid into the housing on one side of the piston at a time. A control valve is coupled to the housing of the hydraulic cylinders and includes a spool moveable within a valve body to control the flow of fluid into the hydraulic cylinders, as is commonly understood. In such an embodiment, the actuation assemblies 84 may be connected to the spools within the control valves to control the movement of the valve body therein, and thus the operation of the servocylinders.

Other embodiments of the flight control system may be used in rotorcrafts other than helicopters, such as autogyros, gyrodynes, and tiltrotors. Although the embodiment described above incorporates the flight control system on the main rotor, it should be understood that the actuation assemblies could be used for other rotors and/or flight control surfaces on rotorcraft or fixed wing aircraft, such as a tail rotor or rudders. Any actuation application which needs triple redundancy or greater may employ this invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. An electromechanical actuation system comprising:
   first, second, and third linear actuators having respective first, second, and third ranges of motion;
   a braking system configured to lock at least the third linear actuator; and
   an output member coupled to the first, second, and third linear actuators at first, second, and third sections of the output member, respectively, and such that a position of a selected portion of the output member is based on actuation of the first, second, and third linear actuators,
   wherein:
      the first, second, and third sections of the output member are each disposed equidistantly from the selected portion of the output member,
      the first, second, and third sections of the output member and the selected portion of the output member all move a first predetermined distance when the first, second, and third linear actuators are each actuated first portions of the respective first, second, and third ranges of motion, and when (i) the third linear actuator is locked by the braking system and (ii) the first and second linear actuators are each actuated second portions of the first and second ranges of motion, the second portions of the first and second ranges of motion being greater than the first portions of the first and second ranges of motion:
the third section of the output member does not move,
the first and second sections of the output member move a second predetermined distance, the second predetermined distance being greater than the first predetermined distance, and
the selected portion of the output member moves the first predetermined distance; and a control system in operable communication with the first, second and third linear actuators and the braking mechanism, the control system being configured to:
cause the first, second, and third linear actuators to actuate the first portions of the respective first, second, and third ranges of motion when the third linear actuator is not locked; and
cause the first and second linear actuators to actuate the second portions of the first and second ranges of motion when the third linear actuator is locked by the braking mechanism.

2. The electromechanical actuation system of claim 1, wherein the braking system comprises a non-backdriveable element within the third linear actuator and configured such that removal of power from the third linear actuator locks the third linear actuator in position.

3. The electromechanical actuation system of claim 1, wherein the braking system comprises a braking mechanism coupled to the third linear actuator and configured such that removal of power from the third linear actuator locks the third linear actuator in position.

4. The electromechanical actuation system of claim 1, wherein the braking system is further configured to lock the second linear actuator, and wherein the output member is coupled to the first, second, and third linear actuators such that when the second and third linear actuators are locked by the braking system, the selected portion of the output member moves the first predetermined distance when the first linear actuator is actuated a third portion of the first range of motion, the third portion of the first range of motion being greater than the first and second portions of the first range of motion.

5. The electromechanical actuation system of claim 4, wherein the first, second, and third linear actuators actuate along respective first, second, and third actuation axes, the first, second, and third actuations axes being substantially parallel.

6. The electromechanical actuation system of claim 5, wherein the second portions of the respective first and second ranges of motion are approximately 1.5 times greater than the first portions of the respective first and second ranges of motion, and the third portion of the first range of motion is approximately 3 times greater than the first portion of the first range of motion.

7. The electromechanical actuation system of claim 1, wherein a rate of actuation of the first and second linear actuators in increased when the third linear actuator is locked, and the rate of actuation of the first linear actuator is further increased when the second and third linear actuators are locked.

8. A flight control system for a rotorcraft having a frame and a rotor coupled to the frame, the flight control system comprising:
a flight control device configured to receive user input and generate a flight control signal representative thereof;
an electromechanical actuation system comprising:
first, second, and third linear actuators having respective first, second, and third ranges of motion;
a braking system configured to lock the third linear actuator; and
a summing member coupled to the first, second, and third linear actuators at first, second, and third sections of the summing member, respectively, the first second, and third sections disposed equidistantly from a selected portion of the summing member, the summing member configured such that the first, second, and third sections and the selected portion of the summing member all move a first predetermined distance when the first, second, and third linear actuators are actuated first portions of the respective first, second, and third ranges of motion and when (i) the third linear actuator is locked by the braking system and (ii) the first and second linear actuators are each actuated second portions of the first and second ranges of motion, the second portions of the first and second ranges of motion being greater than the first portions of the first and second ranges of motion:
the third section of the output member does not move,
the first and second sections of the output member move a second predetermined distance, the second predetermined distance being greater than the first predetermined distance, and the selected portion of the summing member moves the first predetermined distance,
wherein the movement of the selected portion of the summing member causes the rotor to move relative to the frame of the rotorcraft; and
a control system in operable communication with the flight control device, the first, second and third linear actuators, and the braking system, the controller being configured, in response to receiving the flight control signal, to:
cause the first, second, and third linear actuators to actuate the first portions of the respective first, second, and third ranges of motion when the third linear actuator is not locked; and
cause the first and second linear actuators to actuate the second portions of the respective first and second ranges of motion when the third linear actuator is locked.

9. The flight control system of claim 8, wherein the braking system is further configured to lock the second linear actuator and when the second and third linear actuators are locked, the selected portion of the summing member moves the first predetermined distance when the first linear actuator is actuated a third portion of the first range of motion, the third portion of the first range of motion being greater than the first and second portions of the first range of motion.

10. The flight control system of claim 9, wherein the controller is further configured to cause the first linear actuator to actuate the third portion of the first range of motion when the second and third linear actuators are locked.

11. The flight control system of claim 10, wherein the second portions of the respective first and second ranges of motion are approximately 1.5 times greater than the respective first portions of the first and second ranges of motion, and the third portion of the first range of motion is approximately 3 times greater than the first portion of the first range of motion.

12. The flight control system of claim 11, wherein the braking system comprises at least one of a non-backdriveable element within the third linear actuator and configured such that removal of power from the third linear actuator locks the third linear actuator in position and a braking mechanism coupled to the third linear actuator and configured such that removal of power from the third linear actuator locks the third linear actuator in position.

* * * * *